(12) United States Patent
Pronk

(10) Patent No.: US 12,416,385 B2
(45) Date of Patent: Sep. 16, 2025

(54) METHOD OF PREPARING A SYSTEM FOR A MAINTENANCE OPERATION

(71) Applicant: Valvetight Holding BV, Weerselo (NL)

(72) Inventor: Jeroen Martijn Pronk, Gildehaus (DE)

(73) Assignee: Valvetight Holding BV, Weerselo (NL)

( * ) Notice: Subject to any disclaimer, the term of this patent is extended or adjusted under 35 U.S.C. 154(b) by 156 days.

(21) Appl. No.: 18/555,559

(22) PCT Filed: Apr. 4, 2022

(86) PCT No.: PCT/NL2022/050187
§ 371 (c)(1),
(2) Date: Oct. 16, 2023

(87) PCT Pub. No.: WO2022/220676
PCT Pub. Date: Oct. 20, 2022

(65) Prior Publication Data
US 2024/0209991 A1 Jun. 27, 2024

(30) Foreign Application Priority Data

Apr. 16, 2021 (NL) ...................................... 2027992

(51) Int. Cl.
*F17D 1/04* (2006.01)
*A62C 2/04* (2006.01)
(Continued)

(52) U.S. Cl.
CPC .................. *F17D 1/04* (2013.01); *A62C 2/04* (2013.01); *F16L 55/00* (2013.01); *F17D 1/086* (2013.01);
(Continued)

(58) Field of Classification Search
CPC ... F17D 1/04; F17D 1/086; F17D 3/01; F17D 3/03; F17D 3/10; F17D 3/18; F17D 5/005;
(Continued)

(56) References Cited

U.S. PATENT DOCUMENTS 3,777,928 A * 12/1973 Kober ..................... B63B 57/04
48/190
5,727,589 A * 3/1998 Yokogi ..................... F17C 7/00
141/85
(Continued)

FOREIGN PATENT DOCUMENTS

EP 3006813 A1 4/2016
WO 2005026603 A1 3/2005

OTHER PUBLICATIONS

International Search Report mailed Oct. 20, 2022 issued in connection with International Application No. PCT/NL2022/050187 (4 pages total).
(Continued)

*Primary Examiner* — Minh Q Le
(74) *Attorney, Agent, or Firm* — Tatonetti IP

(57) ABSTRACT

A method of preparing a system for a maintenance operation having first subsystem, a second subsystem, and a third subsystem separated by sealing blocks. To reduce the hazard risk, the step of removing gas from the second subsystem via a bleed conduit includes applying the sub-atmospheric pressure using a venturi-pump into which an anoxic gas to drive said venturi-pump is introduced to mix with and remove gas from the second subsystem, said venturi-pump having a maximum venturi ratio Mvr.

11 Claims, 4 Drawing Sheets

Figure 1A:
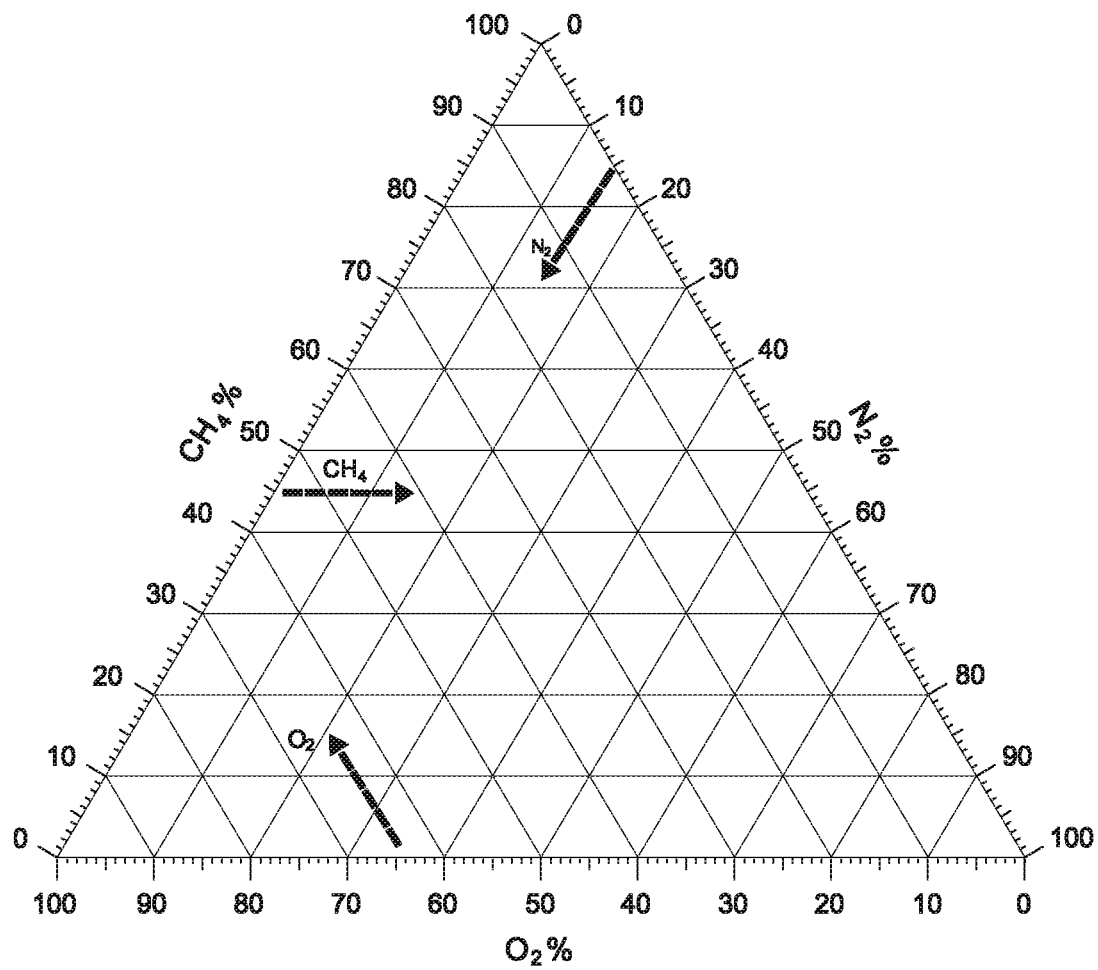

(51) Int. Cl.
   *F16L 55/00* (2006.01)
   *F17D 1/08* (2006.01)
   *F17D 3/01* (2006.01)
   *F17D 3/03* (2006.01)
   *F17D 3/10* (2006.01)
   *F17D 3/18* (2006.01)
   *F17D 5/00* (2006.01)
   *F17D 5/02* (2006.01)

(52) U.S. Cl.
   CPC ............... *F17D 3/01* (2013.01); *F17D 3/03* (2013.01); *F17D 3/10* (2013.01); *F17D 3/18* (2013.01); *F17D 5/005* (2013.01); *F17D 5/02* (2013.01)

(58) Field of Classification Search
   CPC ........ F17D 5/02; G05D 11/008; G05D 11/02; G05D 15/028; G05D 7/00; A62C 2/04; F16L 55/00
   USPC .................................................. 137/1, 487.5
   See application file for complete search history.

(56) References Cited

U.S. PATENT DOCUMENTS 6,857,447 B2*  2/2005  Olander ............... F17C 5/00
                                              700/282
   2006/0027281 A1*  2/2006  Silva ................ B08B 9/032
                                              141/63
   2008/0156505 A1*  7/2008  Wagner ............ A62C 99/0018
                                              169/11
   2009/0314369 A1*  12/2009  Pozniak ............... F17D 5/02
                                              137/861
   2011/0180151 A1*  7/2011  Borgel ................ F17D 1/14
                                              137/14
   2012/0096740 A1*  4/2012  Naylor ............... F17D 1/04
                                              34/562
   2018/0174809 A1*  6/2018  Schuethe .............. G05D 7/00
   2021/0364115 A1*  11/2021  Tadiello ............. F16L 55/00
   2023/0145963 A1*  5/2023  Zhang ................ F17D 1/04
                                              60/740
   2023/0259147 A1*  8/2023  Sharp ............... G05D 16/103
                                              137/512
   2023/0408044 A1*  12/2023  Li .................. F17D 1/086

OTHER PUBLICATIONS

International Search Report mailed Oct. 20, 2022 issued in connection with International Application No. PCT/NL2022/050187 (6 pages total).

* cited by examiner

METHOD OF PREPARING A SYSTEM FOR A MAINTENANCE OPERATION

The present invention relates to a method of preparing a system for a maintenance operation, said system comprising a first subsystem, a second subsystem, a third subsystem and a bleed conduit, wherein
the first subsystem contains a flammable fluid under super-atmospheric pressure,
the second subsystem is located between the first subsystem and the third subsystem, and the system is capable of allowing for the fluid to flow from the first subsystem to the third subsystem via the second subsystem; with
a first sealing block between the first subsystem and the second subsystem capable of being in an open state for passing fluid from the first subsystem to the second subsystem and in a closed state for blocking said flow,
a second sealing block between the second subsystem and the third subsystem capable of being in an open state for passing fluid from the second subsystem to the third subsystem and in a closed state for blocking said flow;
and
said second subsystem being provided with the bleed conduit; said method comprising the step of
ensuring that the first sealing block and the second sealing block are in a closed position,
and in arbitrary order
bringing the third subsystem to atmospheric pressure open to the atmosphere, and
applying sub-atmospheric pressure between the first sealing block and the second sealing block for removing flammable gas from the second subsystem via the bleed conduit before performing said maintenance operation on the third subsystem.

A method according to the preamble is known in the art, in particular from EP3006813. An example of such a system is a system comprising super-atmospheric gas as the fluid in the first subsystem. They are for example systems comprising natural gas, syngas, or hydrogen, where the gas is treated, or increased or reduced in pressure. Often it is paramount that a plant comprising such a system remains operational despite the maintenance, or that the downtime for maintenance is kept to a minimum. The presence of gas escaped from the system at the location where maintenance is to be performed may however pose a risk for people performing the maintenance. Depending on the job at hand, these may be expensive specialists and the number of them can be considerable. If, for example, ambient gas measurements at the location where maintenance is to be performed detect that the leaked gas levels are above what is acceptable according to safety procedures or allowable, the resulting delay can be very costly. To prevent gas in the second subsystem from passing to the area at atmospheric pressure at the location where the maintenance operation on the third subsystem is to be performed, it is known to block gas from passing from the first subsystem to the third subsystem using the first and second sealing block seat, and then bleed the gas from the second subsystem via a bleed conduit into the outside atmosphere away from personnel. Applying vacuum to the second subsystem causes a negative pressure difference over the second sealing block which prevents fluid in the second subsystem from leaking downstream into the third subsystem or the area of the third subsystem. However, with a negative pressure difference, ambient air which contains oxygen may now enter the second subsystem, presenting a hazard in itself, as the flammable gas and oxygen from the air form a potentially explosive mixture.

The object of the present invention is to provide a method according to the preamble in which the explosion hazard risk is reduced.

To this end, a method according to the preamble is characterized in that the step of removing gas from the second subsystem via the bleed conduit comprises applying the sub-atmospheric pressure using a venturi-pump into which an anoxic gas to drive said venturi-pump is introduced to mix with and remove gas from the second subsystem, said venturi-pump having a maximum venturi ratio Mvr, where $$Mvr = Sf \times \frac{2-2\left(\frac{\frac{(1-LADOC)\sqrt{3}}{1-2\,O_2} - \sqrt{3}}{\frac{\sqrt{3}}{1-2\,O_2} - \sqrt{3}}\right)}{2\left(\frac{\frac{(1-LADOC)\sqrt{3}}{1-2\,O_2} - \sqrt{3}}{\frac{\sqrt{3}}{1-2\,O_2} - \sqrt{3}}\right) - 1}$$

wherein
$S_f$ is a safety factor having a value of 2 or less,
$O_2$ is the volumetric oxygen concentration in ambient air,
LADOC (Lowest Air-Derived Oxygen Concentration) is an $O_2$ concentration in vol. % that can be determined with a equilateral triangular flammability diagram, said flammability diagram having
a horizontal base of the equilateral triangle indicating the oxygen concentration in volume percent with 0 vol. % at the right and 100 vol. % at the left,
a right side of the equilateral triangle indicating the concentration of the anoxic gas in volume percent, with 0 vol. % at the top and 100 vol. % at the bottom, and
a left side of the equilateral triangle indicating the concentration of the flammable gas in volume percent with 0 vol. % at the bottom and 100 vol. % at the top; and
a flammability area where a mixture comprising the flammable gas and oxygen is flammable, and
defining an air line running from the apex of the equilateral triangle to the horizontal base at 21 vol. % oxygen where the ratio of the oxygen concentration and the anoxic gas is equal to the concentration of oxygen to other gases in air;
wherein the steps of determining the LADOC are
moving a line parallel to the air line until it has a single point in common with the flammability area, and
determining the oxygen concentration (LADOC) at the intersection of said line and the horizontal base.

This allows for maintenance on equipment in or of the third subsystem more safely while the fluid in the first subsystem is at the elevated (super-atmospheric) pressure. With an $S_f$ of 1 or less, then irrespective of the volume of air that may leak into the second subsystem due to sub-atmospheric pressure, the concentrations of the oxygen and the flammable gas in the gas mixture exhausted from the venturi will never be such that it is in the flammable area.

In the present application, maintenance includes any work downstream of the second sealing block, whether it is inspection, cleaning, repair, modification, or replacement of a part. A maintenance operation is a series of one or more maintenance steps, and the method according to the invention specifies that at least one of these steps is not performed before the discharge of fluid in a gaseous state using suction and sub-atmospheric pressure in the second subsystem. The third subsystem typically comprises an apparatus such as a compressor, a flow metering system, a gas drying equipment, a tank or a vessel, a filter separator, a heat exchanger, a well head, pig trap or a vapour recovery unit.

A sealing block may for example be part of a ball valve comprising a valve seat.

Active discharge (suction) of fluid is achieved using a vacuum-pump.

By way of example, a sub-atmospheric pressure between the first sealing block and the second sealing block prevents fluid from leaving the second subsystem via a route other than the bleed conduit. Any sub-atmospheric pressure is effective, however minute. For practical purposes, the sub-atmospheric pressure is at least 0.02 Bar below ambient atmospheric pressure, preferably at least 0.05 Bar and more preferably at least 0.08 Bar. A deeper sub-atmospheric pressure makes the method less susceptible to any changes in sub-atmospheric pressure applied or other disturbances.

In the present application, the term fluid comprises i) liquid and ii) gas (also encompasses vapour, e.g coming from liquid).

The term 'sealing block' is a seal such as a valve, balloon or plug for blocking the flow of fluid from a subsystem other than the second subsystem to the second subsystem wherein the latter is kept at a sub-atmospheric pressure.

In the present application, a bleed conduit for gas is referred to as a vent opening or vent conduit. A bleed conduit for liquid is referred to as a drain opening or drain conduit. The step of discharging fluid present between the first sealing block and the second sealing block via the bleed conduit typically involves discharging the fluid via the bleeding conduit that is also used for the removal of flammable gas using sub-atmospheric pressure, but it may be a further bleed conduit of the second subsystem.

Typically, gas is discharged from the second subsystem via the bleed conduit using a vent conduit that releases the gas into the outside atmosphere at a safe location away from the location where maintenance is to be performed. The vent line typically comprises between a pressure gauge and the venturi-pump a valve, e.g. an on-off valve, a control valve, a pressure regulator, or a non-return valve. A valve is advantageous as it allows for maintaining a sub-atmospheric pressure without having to run the venturi-pump continuously. The mixture of anoxic gas used to drive the venturi-pump and flammable gas is typically passed away from the system and released into the atmosphere.

Mixing the flammable gas with the anoxic gas will reduce the flammability of the resulting mixture. A flammability triangle shows the area of the gas where a mixture comprising the flammable gas and oxygen is flammable, i.e. where the concentrations of oxygen and combustible compound are such that the mixture may be ignited. For pure methane in pure air this is between about 5 and 15 vol. % of methane.

In the present application, the term anoxic gas means a gas containing less than 10% by volume of oxygen, preferably less than 6% by volume, more preferably less than 2% by volume and most preferably less than 0.5% by volume oxygen).

WO2005/026603 discloses a method of vacuum-purging gas in a pipe or tank. "EMERGENCY PIPELINE REPAIR SYSTEMS DEVELOPED TO FACILITATE PIPELINE REPAIR OF UNPIGGABLE DEFECTS" by Dale Milward (http://ppsa-online.com/papers/12-Aberdeen/2012-07-STATS-Group-paper.pdf) discloses a method of preparing a system for maintenance involving the discharge of gas.

According to a favourable embodiment, the system comprises an oxygen concentration sensor, and the fluid extracted via the bleed conduit is a gas comprising a combustible component wherein
- the oxygen concentration measured in said gas, and
- if the oxygen concentration surpasses a preselected value,
  - the pressure difference between the second subsystem and atmospheric pressure is reduced by reducing the flow of anoxic gas used to drive the venturi-pump.

Thus the safety of the method is further enhanced. The source of the oxygen will typically be air downstream of the second sealing block entering the second subsystem, which process may be enhanced by the sub-atmospheric pressure. Lowering the pressure difference will reduce the ingress of air.

According to a favourable embodiment, the system comprises a pressure sensor for determining the pressure in the second subsystem and the bleed conduit comprises a valve for blocking the flow of gas comprising a combustible component through the bleed conduit; wherein
- the pressure in the second subsystem is reduced to a pressure i) below the pressure in the first subsystem and ii) at most equal to atmospheric pressure,
- the valve of the bleed conduit is closed,
- a change in pressure in the second subsystem in time is determined indicating a rate of leakage of flammable fluid from the first subsystem, and
- the valve of the bleed conduit is opened to remove the flammable gas from the second subsystem.

A combustible gas is typically explosive only within a range defined by a low and a high flammable gas concentration. With the above embodiment leakage from the first subsystem can be determined. For a more accurate measurement, the pressure in the second subsystem is preferably reduced to a pressure equal to atmospheric pressure so as to reduce the effect of any air leaking into the second subsystem. Knowing the flow rate of fluid leaking from the first subsystem into the second subsystem makes it possible to use a relatively low flow rate of motive gas (and thus saving cost) while still reducing the risk of operating in the range where an explosion may occur.

According to a first embodiment, the venturi-pump is operated intermittently, where once the pressure in the second subsystem rises towards a predetermined level below atmospheric pressure, the valve is opened, and the venturi-pump is operated to remove the flammable gas, following which the valve is closed and the supply of anoxic gas to the venturi-pump is stopped. The pressure will rise again, and the process is repeated.

According to a second embodiment, the venturi-pump is chosen to have a sufficient capacity for removing the flammable gas from the second subsystem and continuously operated to remove the flammable gas from the second subsystem. The venturi-pump chosen will have a capacity of typically less than 3 times the rate of leakage of gas into the second subsystem, preferably less than 2 times said rate and more preferably less than 1.5 times said rate. This reduces the anoxic gas consumption and hence the cost of performing the method.

Operating at a sub-atmospheric pressure that differs more from atmospheric pressure than necessary would also increase the ingress of oxygen and thus increase the risk of operating in said range. This is already the case at the inlet of the venturi-pump, and the mixing (and dilution) in the venturi-pump with anoxic motive gas will of course not adversely affect that. This is also a situation where a not-fully deoxygenated air may be used as a motive gas for driving the venturi-pump.

Operating at sub-atmospheric pressure allows for an oxygen-sensor to determine the leakage across the second sealing block.

According to a favourable embodiment, the fluid comprises a liquefied gas and vapour, wherein after the step of ensuring the sealing blocks are in a closed position, the liquefied gas is drained from the second subsystem before removing the vapour in the second second subsystem using the sub-atmospheric pressure by the venturi-pump via the at least one bleed conduit.

This reduces the amount of fluid that has to be removed using the venturi-pump and the amount of anoxic gas to be used, thus saving cost.

The liquefied gas is for example LPG or LNG.

According to a favourable embodiment, the fluid is liquefied gas, wherein the liquefied gas is extracted from the second subsystem via the bleed conduit and subsequently heated to turn it into vapour and discharged using the venturi-pump driven by the anoxic gas.

This embodiment is preferably done in combination with the embodiments discussed above concerning the use of an anoxic gas and/or monitoring of the oxygen concentration.

The bleed conduit is a drain opening.

According to a favourable embodiment, the system comprises a heat exchanger upstream of a tank for collecting liquid, wherein the heat exchanger is connected to the bleed conduit and the tank is upstream of a venturi-pump for applying sub-atmospheric pressure.

The tank allows for collecting any liquid that inadvertently may make it through the heat exchanger. The venturi-pump will be operated as the venturi-pump described earlier, and it may be the same venturi-pump.

According to a favourable embodiment, the sub-atmospheric pressure difference between the second subsystem and the third subsystem is kept to less than 0.25 Bar, preferably less than 0.1 Bar.

Thus the ingress of air is reduced, reducing the risk of an explosion. In addition, in case of a system comprising sub-systems at less than 0° C., ingress of water vapour (in the air) is reduced, helping to prevent the formation of ice that could adversely affect the system and/or maintenance operation, for example by clogging a bleed conduit.

According to a favourable embodiment, the system comprises a pressure sensor for determining the pressure in the second subsystem and the venturi-pump is controlled using a controllable valve using input from the pressure sensor to control the flow rate of the anoxic gas for driving the venturi-pump, wherein the sub-atmospheric pressure difference between the second subsystem and atmospheric pressure is maintained below 75 mbar, preferably in a range of 2 to 18 mbar, and more preferably between 5 and 10 mBar.

Thus the risk of ingress of ambient air (and hence oxygen) into the second subsystem is reduced to a large extent.

According to a favourable embodiment, the system comprises a pressure sensor for determining the pressure in the second subsystem and the venturi-pump is operated at a set flow rate of anoxic gas, and further gas comprising anoxic gas is introduced into the second subsystem to maintain the sub-atmospheric pressure difference between the second subsystem of less than 75 mbar, preferably in a range of 2 to 18 mbar, and more preferably between 5 and 10 mBar.

Thus the risk of ingress of ambient air (and hence oxygen) into the second subsystem is reduced to a large extent.

According to a favourable embodiment, the anoxic gas is an inert gas, preferably an inert gas chosen from carbon dioxide and nitrogen.

Thus the risk of an explosion or the risk of fire is reduced.

In the present application, the term inert gas is a gas that isn't an oxidant nor flammable. Examples of inert gases are noble gases, and for reasons of cost carbon dioxide, and preferably nitrogen; including mixtures thereof, said mixtures conforming to the oxygen concentrations as specified above for anoxic gas.

According to a favourable embodiment, the anoxic gas is a flammable gas, preferably the same gas as present in the first subsystem, and the gas exhausted by the venturi-pump is captured.

According to this highly advantageous embodiment, the exhausted gas is captured, preventing emissions. It may be re-used, for example passed back to the first subsystem, and liquefied if necessary to do so. This is also more environmentally advantageous than flaring.

This embodiment is in particular suitable for (liquefied) hydrocarbons, such as hydrogen, methane, LNG, propane, LPG and butane.

Figure 1B:
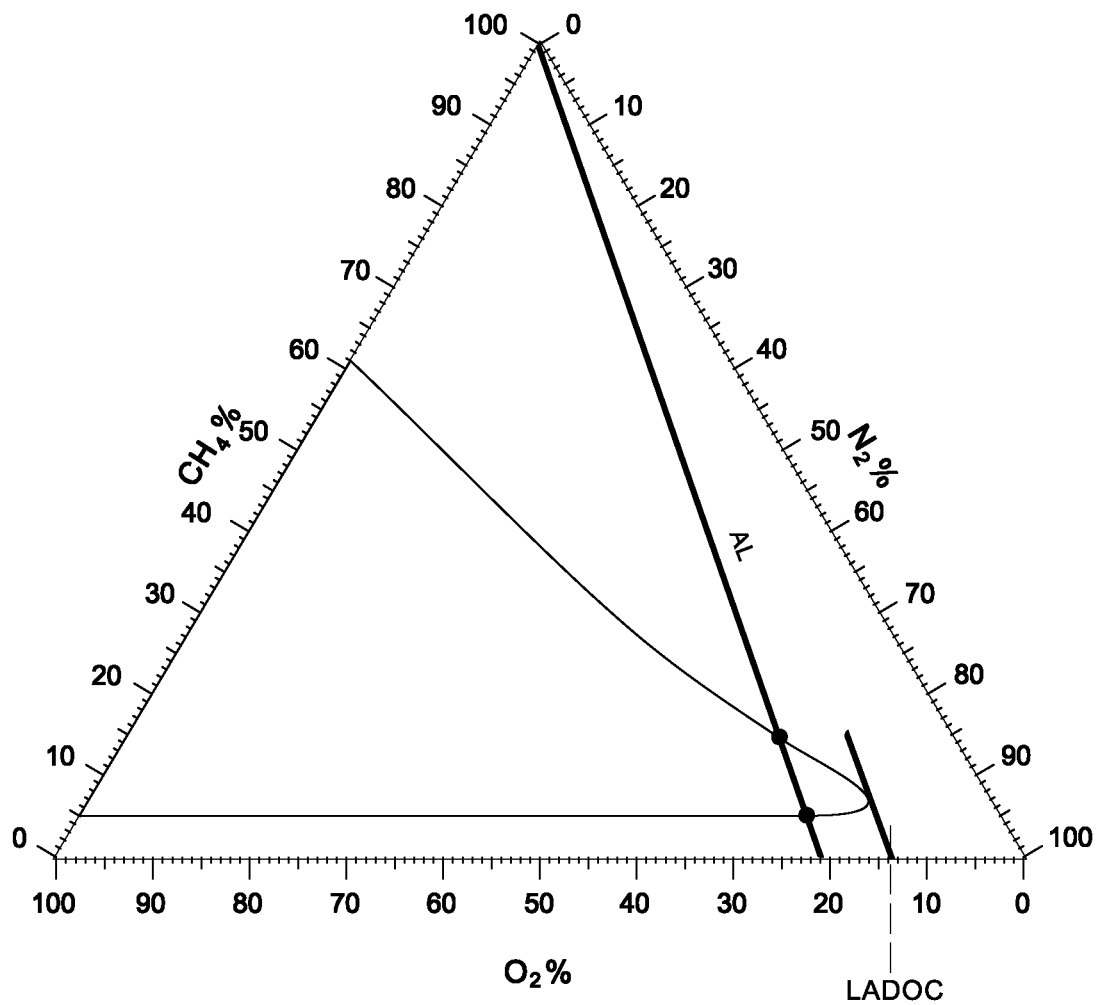
Figure 2:
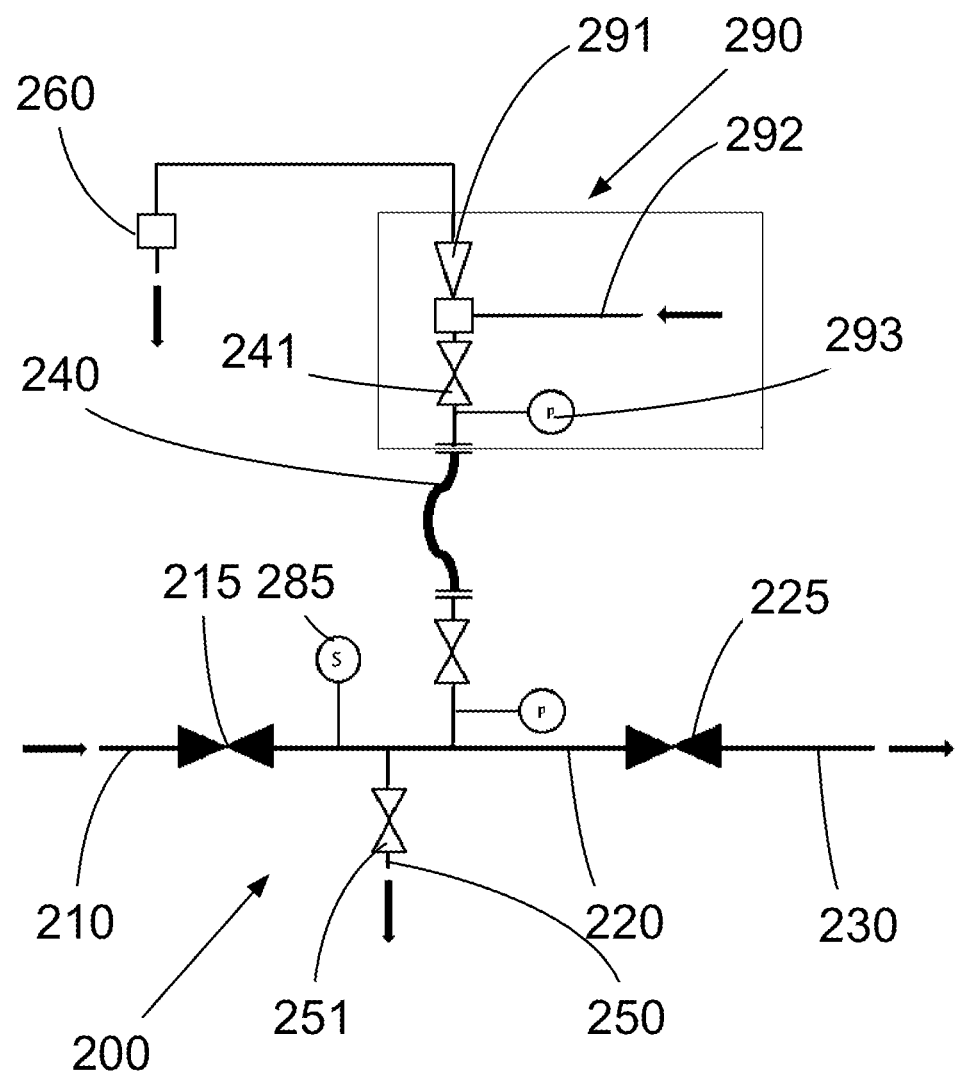
Figure 3:
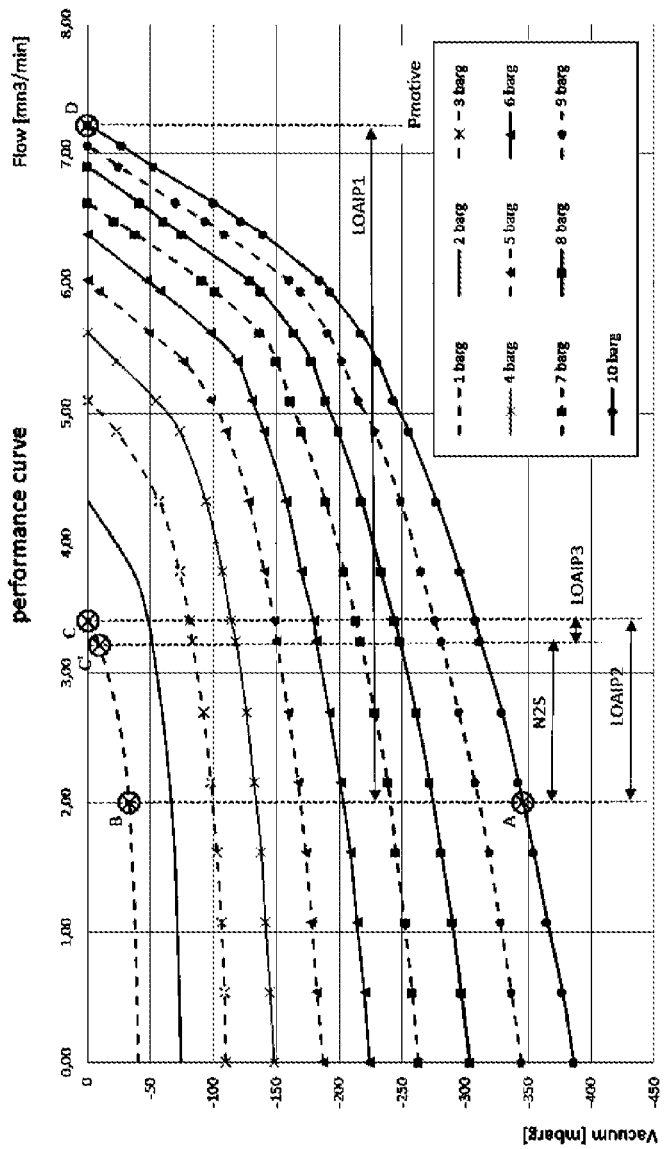

The present invention will now be illustrated with reference to the drawing where FIG. 1A and FIG. 1B illustrate a flammability diagram;

FIG. 2 shows a diagram of system for use with the method according to the invention; and FIG. 3 shows a diagram for determining suitable working conditions.

FIG. 1A and FIG. 1B illustrate a flammability diagram. It comprises
- a horizontal base indicating the oxygen concentration in volume volume percent with 0 vol. % at the right and 100 vol. % at the left,
- a right side of the equilateral triangle indicating the concentration of the anoxic gas (here inert gas $N_2$) in volume percent, with 0 vol. % at the top and 100 vol. % at the bottom, and
- a left side of the equilateral triangle indicating the concentration of the flammable gas (here $CH_4$) with 0 vol. % at the bottom and 100 vol. % at the top; and
- a flammability area where a mixture of the flammable gas and oxygen are flammable (shown in FIG. 1B only).

By way of example, the tip of the arrow labelled $CH_4$ is at a concentration of about 45 vol. % $CH_4$, 15 vol. % $N_2$ and 40 vol. % $O_2$.

FIG. 1B corresponds to FIG. 1A, except that the auxiliary lines have been removed and an area in which $CH_4$ is flammable is shown as a blob at the left extending towards the right. In the absence of nitrogen, methane is flammable in a concentration between 5 vol. % and 61 vol. % with the remainder oxygen.

In case outside air enters a system containing methane, not only oxygen is supplied, but also inert gases, mainly nitrogen and in minute quantities noble gases and carbon dioxide. If methane in a system is mixed with air, the maximum achievable oxygen concentration is the concentration of oxygen in atmospheric air, i.e. 21 vol. % (see base of the flammability triangle) at sea level. At most 100 vol. % $CH_4$ is present (see apex of the flammability triangle). Any mixture is on a line (AL; air line) between these two points in the flammability triangle.

In FIG. 1B it can be see there are two points of intersection (black dots); in other words, a range of flammable air-$CH_4$ mixtures exist.

In accordance with the present invention, as will be explained in more detail with reference to FIG. 2, the $CH_4$ which may be mixed with oxygen due to ingress of air in a system on which a maintenance operation is to be performed, is removed from the system using a venturi-pump. The venturi-pump is driven with an anoxic motive gas, which in the present example is nitrogen which mixes with and dilutes the mixture of $CH_4$ and air. This corresponds to the air line AL to be moved to the right. This reduces the risk of an explosion, in particular if the dilution is so large that dilution is more than where the shifted line is a tangent to the flammability area (blob). Then the oxygen concentration is equal to (or lower than) the LADOC (Lowest Air-Derived Oxygen Concentration).

In accordance with the present invention, the venturi ratio is at most $$Mvr = Sf \times \frac{2-2\left(\frac{\frac{(1-LADOC)\sqrt{3}}{1-2O_2}-\sqrt{3}}{\frac{\sqrt{3}}{1-2O_2}-\sqrt{3}}\right)}{2\left(\frac{\frac{(1-LADOC)\sqrt{3}}{1-2O_2}-\sqrt{3}}{\frac{\sqrt{3}}{1-2O_2}-\sqrt{3}}\right)-1}$$

The safety factor Sf is preferably less than 1.3 and more preferably less than 1.

The flammability diagram is a flammability diagram as determined using the method specified by EN1839(T).

FIG. 2 shows a diagram of system 200 for use with the method according to the invention.

The system 200 comprises a first subsystem 210, a second subsystem 220, a third subsystem 230 and a bleed conduit 240. In regular use, a flammable fluid (such as super-atmospheric methane), passes from the first subsystem 210, via the second subsystem 220, to the third subsystem 230.

In case maintenance has to be performed on the third subsystem 230, the workspace should be safe for personnel and typically the owner of the system 200 doesn't like the system 200 to be demolished by an explosion either.

To avoid making the headlines, the system 200 comprises a first sealing block 215 (typically a first valve 215) between the first subsystem 210 and the second subsystem 220 capable of being in an open state for passing fluid from the first subsystem to the second subsystem and in a closed state for blocking said flow. Furthermore, the system 200 comprises a second sealing block 225 (typically a second valve 225) between the second subsystem 220 and the third subsystem 230 capable of being in an open state for passing fluid from the second subsystem 220 to the third subsystem 230 and in a closed state for blocking said flow.

In case the system 200 is used for a flammable fluid in the first subsystem 210 that is liquid, the liquid in the second subsystem may be drained using a second conduit 250 comprising a further valve 251.

In accordance with the present invention, to perform a maintenance operation on the third subsystem 230, the first valve 215 and second valve 225 are closed (was well as the further valve 251), and a venturi-pump 291 is used to extract gas in the second subsystem 220. The venturi-pump 291 has an venturi-ratio that has been selected to be below the Mvr.

The venturi-pump 291 may be part of a separate unit 290 that is connectable to the bleed conduit 240.

The venturi-pump 291 is operated using an anoxic gas, in the present example nitrogen supplied via supply conduit 292. By reducing the pressure inside the second subsystem 220 to sub-atmospheric pressure, leakage of flammable fluid from the second subsystem 220 to the third subsystem 230 is prevented and the third subsystem 230 may be exposed to the atmosphere as is known in the art.

With a bleed conduit valve 241 it is possible to determine which sealing block may be leaking. By making the pressure of the second subsystem 220 equal to atmospheric pressure followed by closing the bleed conduit valve 241, an increase in pressure indicates a leaking first sealing block 215. With a sub-atmospheric pressure below atmospheric pressure, a combined leakage is determined. An oxygen sensor 285 for measuring gas of the second subsystem may be used to determine whether the second sealing block 225 is leaking, which data may be used to determine the individual rates of leakage at said sub-atmospheric pressure in the second subsystem 220.

The lower the pressure in the second subsystem 220 and thus the greater the pressure difference with the surrounding air, the more air may ingress into the second subsystem 220 from the third subsystem 230 that is open to atmospheric air. To reduce the risk, the pressure inside the second subsystem 220 may be measured using a pressure sensor 293 and kept slightly below atmospheric pressure. Instead or alternatively, it may also be possible to introduce an inert gas into the second subsystem 220 via the conduit 250.

The gas emanating from the venturi-pump 291 may be flared off, but is preferably liquefied in cryogenic apparatus 260 and used instead of wasted.

Sensors may be used at various locations in the system, and an alarm may be given in various cases as desired such as:

1. Vacuum low (loss of vacuum)
2. Leak rate increase
3. Blocked bleed
4. Motive pressure low
5. Flammability alarm inlet
6. Flammability alarm outlet
7. $O_2$ inlet high (y %>LADOC)
8. $O_2$ outlet high (y %>LADOC)
9. $CH_4$ content inlet high (z %>Lowest $CH_4$ concentration)
10. $CH_4$ content outlet high (z %>Lowest $CH_4$ concentration)
11. Wire break alarm process (vacuum) pressure transmitter
12. Wire break alarm motive pressure transmitter Description of a Method to Determine the Leak Rate By depressurizing the second subsystem to sub-atmospheric pressure, preferably maximum achievable sub-atmospheric pressure within the capabilities of the venturi pump, then closing in the second subsystem by closing a valve in the bleed conduit, the vacuum loss can be measured over time. When the known volume of the second subsystem+ volume of the bleed conduit is known, the combined leak rate can be established by multiplying the loss of vacuum (in bar/minute) by the volume (in litres) which will give the leak rate (in litres/minute). When then the valve in the bleed conduit is opened and the second subsystem is evacuated again by the venturi pump, the $O_2$ content can be measured. With the $O_2$ content coming from the air, leaking through the second sealing block from the third subsystem into the second subsystem, and the known concentration of 21% $O_2$ in air, the ratio between gas leaking through the first sealing block and air leaking through the second sealing block can be determined. By multiplying established combined leak rate with the respective ratios of gas and air, the leak rate of gas and air (in litres/minute) can be established.

By way of example, if the measured $O_2$ concentration in the second subsystem is 7%, it would mean that 7/21=⅓rd (or 33.33%) of the content is air which leaked from the third subsystem through the second sealing block into the second subsystem. The remainder is then gas which has leaked from the first subsystem through the first sealing block into the second subsystem, which is 100-33.33=66.67%. The ratio of gas to air can now be determined by dividing the gas content by the air content, which is 66.67/33.33=2 in this case. If the leak rate through the first sealing block had been determined before, and would be for example 2.0 $m_n^3$/min, then the influx of air into the second subsystem through the second sealing block would be 1.0 $m_n$s/min. Adding up to a combined leak rate of 3.0 $m_n^3$/min.

Description of Methods to Reduce Motive Consumption

To save cost and resources, the objective is to save the motive consumption as much as practically possible. When the combined leak rate is established of fluid and air leaking into the second subsystem, the motive consumption can be reduced according to the following methods of operating:
1) Selecting a venturi pump according the Mvr formula and with a capacity higher than the combined leak rate
2) Operating the venturi pump in "on-off mode". The venturi pump is on (motive supply to the venturi is open) until a certain vacuum level equaling the "Setpoint OFF" is reached (e.g. −300 mbarg (mbar gauge)), then the valve between the pressure measurement and the venturi pump in the bleed conduit is closed and the vacuum in the second subsystem is locked-in, which allows the supply of anoxic gas to the venturi-pump to be stopped, saving anoxic gas (and essential if the anoxic gas is a flammable gas). The vacuum level will be lower due to the gas and/or air leaking into the second subsystem. When a low vacuum level equaling "Setpoint ON" is reached (e.g. −50 mbarg) the venturi pump is switched on (opening motive supply to the venturi pump) and the valve in the bleed conduit is opened until Setpoint OFF is reached, and so forth. The motive is only consumed when the venturi pump is switched ON, and there is zero motive consumption when the venturi is switched OFF
3) When "on-off mode" is not possible or does not provide the required motive consumption savings (e.g. due to too short interval) then the venturi pump can be switched on and the motive supply pressure can be throttled. With reduced motive supply pressure, the motive flow (and thereby consumption) will be lower, but also the vacuum level will be lower. When the vacuum level in the second subsystem is lowered to as low as practically acceptable levels, still being sub-atmospheric, the motive supply can be minimized. The added advantage of this method that:
   a. The maximum LOAIP1 (left over air ingress potential) is reduced. Less potential for air ingress means less possible $O_2$ in the second subsystem means less chance of an explosive mixture in the second subsystem.
   b. By a lower (less deep) vacuum there is less driving force for the air to leak from the third subsystem via the second sealing block into the second subsystem, and therefore there the actual air ingress will be less. Therefore there is a less chance of an explosive mixture in the second subsystem.

When the DBB-SAVER venturi-pump outlet is straight to atmosphere, the pressure difference over the venturi-pump will create sub-atmospheric (vacuum) conditions on the inlet side of the venturi-pump. In the performance curve of a venturi-pump with outlet straight to atmosphere, the suction flow is set out against the inlet pressure in below diagram "DBB-SAVER performance curve". This is shown in FIG. 3.

On the horizontal axis is the suction flow, in normalized cubic metres per minute. On the vertical axis is the pressure difference over the venturi-pump (or the vacuum level in the suction side of the venturi-pump with an outlet straight to atmosphere without any pressure losses) in millibar gauge. Each curve is established for a certain fluid as medium on the suction side (in this example methane —$CH_4$), and with motive also a certain fluid (in this example nitrogen —$N_2$) at a certain fixed motive inlet pressure at the motive inlet nozzle of the venturi-pump, the motive flow will also be a fixed value. The lower the motive inlet pressure, the lower the motive flow and hence the lower will be the motive consumption. For the curves in FIG. 3, the motive inlet pressures are specified in the legend.

When in this example the motive inlet pressure of the venturi-pump 291 is 10 barg, the motive medium is $N_2$, and the to be mitigated leak rate of gas (in this example $CH_4$) flowing from the first subsystem through the first sealing block 215 to the second subsystem 220 is 2.0 normalized cubic meter per minute ($m_n^3$/min) the vacuum reading on the inlet of the venturi-pump 291 will be −345 mbarg according to the curve (operation point A on the curve). The maximum free flow (no pressure difference over suction and discharge side of the venturi-pump) with the said motive inlet pressure is point D. The potential of ambient air ingress from the third subsystem 230 (being the safe working area) being sucked into the second subsystem 220 in case of leakage over the second sealing block 225 can be assessed by determining line LOAIP1 (Left Over Air Ingress Potential). In this example that would be the flow of point D (7.2 $m_n^3$/min) minus the flow of point A (2 $m_n^3$/min) which is 5.2 $m_n^3$/min. This value is accurate for the medium on the suction side of the venturi-pump 291, as this curve is calibrated for this specific medium. In this example $CH_4$. The actual value in $m_n^3$/min for air would be less when the air is denser than the medium on the suction side. For $CH_4$ having a density of 0.7 kg/$m_n^3$ and air having a density of 1.27 kg/$m_n^3$, the actual LOAIP1 is <5.2 $m_n^3$/min of air.

When reducing the motive inlet pressure to the venturi-pump 291 from 10 barg to 1 barg, and no change in the leak rate over the first sealing block 215, a new working point will be established (point B in the curve) and the vacuum reading on the inlet of the venturi-pump will be −30 mbarg according to the curve. The Left Over Air Ingress Potential for working point B can be assessed by determining the free flow working point C. Following the same method as for LOAIP1, the LOAIP2 can be determined, which is 3.4-2=1.4. Therefore the actual LOAIP of air is <1.4. Also, LOAIP2 is less then LOAIP1, regardless of the medium on the suction side of the venturi-pump.

It is clear that by reducing the motive supply to the venturi-pump, the maximum flow capacity of the venturi-pump is reduced and thereby there is less potential for air ingress in the second subsystem. This method is used to make sure the potential fuel/air mixture in the second subsystem is above the UFL (Upper flammability limit, also called UEL which means upper explosive limit). In other words, the mixture is too "rich" to be flammable, as there is not enough oxygen (from the air) to create a flammable mixture. In worst case conditions when the LOAIP value of a curve calibrated for a medium on the suction side which a density less then air is used, the values of this medium can be used as worst case condition, as the actual air flow would be lower, and reduction of air flow is the objective. For the flammability assessment these values can be used. With the actual air flow values the mixture would be richer and therefore more distance from the UFL which reduces the chance of a flammable mixture.

Another method to reduce the chance on a flammable mixture in the second subsystem 220 is to supply an inert gas, for example nitrogen, into the second subsystem 220. If we take working point B as an example, the LOAIP2 would be the line to assess the potential for air ingress from the third subsystem 230 into the second subsystem 220. When supplying nitrogen into the second subsystem 220, with the equivalent of the line N2S (short for nitrogen supply line), which can be established by determining the difference between the flow of point B and C'. The left over potential for air ingress under said conditions can be determined by the line C'-C. In this example the nitrogen is supplied into the second subsystem 220 via a supply line 250 which comprises a pressure regulator, set at a pressure of −7.5 mbarg. This will create the new working point C'. The amount of nitrogen required to establish working point C' can be determined by line N2S. From C' the new air ingress potential can be determined by line LOAIP3, which is obviously less than the air ingress potential as determined by line LOAIP2. Therefore risk of creating a flammable mixture is further reduced.

The advantage of supplying nitrogen to the second subsystem 220 in combination with a reduced motive supply pressure to the venturi-pump 291 is that the required nitrogen consumption for the suppletion (N2S) is also reduced.

The invention claimed is:

1. A method of preparing a system for a maintenance operation, said system comprising a first subsystem a second subsystem, a third subsystem and a bleed conduit, wherein
the first subsystem contains a flammable fluid under super-atmospheric pressure,
the second subsystem is located between the first subsystem and the third subsystem, and the system is capable of allowing for the fluid to flow from the first subsystem to the third subsystem via the second subsystem; with
a first sealing block between the first subsystem and the second subsystem capable of being in an open state for passing fluid from the first subsystem to the second subsystem and in a closed state for blocking said flow,
a second sealing block between the second subsystem and the third subsystem capable of being in an open state for passing fluid from the second subsystem to the third subsystem and in a closed state for blocking said flow; and
said second subsystem being provided with the bleed conduit;
said method comprising the step of
ensuring that the first sealing block and the second sealing block are in a closed position, and in arbitrary order
bringing the third subsystem to atmospheric pressure open to the atmosphere, and
applying sub-atmospheric pressure between the first sealing block and the second sealing block for removing flammable gas from the second subsystem via the bleed conduit before performing said maintenance operation on the third subsystem;
wherein the step of removing gas from the second subsystem via the bleed conduit comprises applying the sub-atmospheric pressure using a venturi-pump into which an anoxic gas to drive said venturi-pump is introduced to mix with and remove gas from the second subsystem, said venturi-pump having a maximum venturi ratio Mvr, where $$Mvr = Sf \times \frac{2-2\left(\frac{\frac{(1-LADOC)\sqrt{3}}{1-2O_2} - \sqrt{3}}{\frac{\sqrt{3}}{1-2O_2} - \sqrt{3}}\right)}{2\left(\frac{\frac{(1-LADOC)\sqrt{3}}{1-2O_2} - \sqrt{3}}{\frac{\sqrt{3}}{1-2O_2} - \sqrt{3}}\right) - 1}$$

wherein
$S_f$ is a safety factor having a value of 2 or less,
$O_2$ is the volumetric oxygen concentration in ambient air,
LADOC (Lowest Air-Derived Oxygen Concentration) is an $O_2$ concentration in vol. % that can be determined with a equilateral triangular flammability diagram, said flammability diagram having
a horizontal base of the equilateral triangle indicating the oxygen concentration in volume percent with 0 vol. % at the right and 100 vol. % at the left,
a right side of the equilateral triangle indicating the concentration of the anoxic gas in volume percent, with 0 vol. % at the top and 100 vol. % at the bottom, and
a left side of the equilateral triangle indicating the concentration of the flammable gas in volume percent with 0 vol. % at the bottom and 100 vol. % at the top; and
a flammability area where a mixture comprising the flammable gas and oxygen is flammable, and
defining an air line running from the apex of the equilateral triangle to the horizontal base at 21 vol. % oxygen where the ratio of the oxygen concentration and the anoxic gas is equal to the concentration of oxygen to other gases in air;
wherein the steps of determining the LADOC are
moving a line parallel to the air line until it has a single point in common with the flammability area, and
determining the oxygen concentration (LADOC) at the intersection of said line and the horizontal base.

2. The method of claim 1, wherein the system comprises an oxygen concentration sensor, and the fluid extracted via the bleed conduit is a gas comprising a combustible component wherein
the oxygen concentration measured in said gas, and
if the oxygen concentration surpasses a preselected value, the pressure difference between the second subsystem and atmospheric pressure is reduced by reducing the flow of anoxic gas used to drive the venturi-pump.

3. The method of claim 2, wherein the system comprises a pressure sensor for determining the pressure in the second subsystem and the bleed conduit comprises a valve for blocking the flow of gas comprising a combustible component through the bleed conduit; wherein
the pressure in the second subsystem is reduced to a pressure i) below the pressure in the first subsystem and ii) at most equal to atmospheric pressure,
the valve of the bleed conduit is closed,
a change in pressure in the second subsystem in time is determined indicating a rate of leakage of flammable fluid from the first subsystem, and
the valve of the bleed conduit is opened to remove the flammable gas from the second subsystem.

4. The method of claim 3, wherein the fluid comprises a liquefied gas and vapour, wherein after the step of ensuring the sealing blocks are in a closed position, the liquefied gas is drained from the second subsystem before removing the vapour in the second subsystem using the sub-atmospheric pressure by the venturi-pump via the at least one bleed conduit.

5. The method of claim 4, wherein the fluid is liquefied gas, wherein the liquefied gas is extracted from the second subsystem via the bleed conduit and subsequently heated to turn it into vapour and discharged using the venturi-pump driven by the anoxic gas.

6. The method of claim 5, wherein the system comprises a heat exchanger upstream of a tank for collecting liquid, wherein the heat exchanger is connected to the bleed conduit and the tank is upstream of a venturi-pump for applying sub-atmospheric pressure.

7. The method of claim 6, wherein the sub-atmospheric pressure difference between the second subsystem and the third subsystem is kept to less than 0.25 Bar, preferably less than 0.1 Bar.

8. The method of claim 7, wherein the system comprises a pressure sensor for determining the pressure in the second subsystem and the venturi-pump is controlled using a controllable valve using input from the pressure sensor to control the flow rate of the anoxic gas for driving the venturi-pump, wherein the sub-atmospheric pressure difference between the second subsystem and atmospheric pressure is maintained below 75 mbar, preferably in a range of 2 to 18 mbar, and more preferably between 5 and 10 mBar.

9. The method of claim 8, wherein the system comprises a pressure sensor for determining the pressure in the second subsystem and the venturi-pump is operated at a set flow rate of anoxic gas, and further gas comprising anoxic gas is introduced into the second subsystem to maintain the sub-atmospheric pressure difference between the second subsystem of less than 75 mbar, preferably in a range of 2 to 18 mbar, and more preferably between 5 and 10 mBar.

10. The method of claim 9, wherein the anoxic gas is an inert gas, preferably an inert gas chosen from carbon dioxide and nitrogen.

11. The method of claim 9, wherein the anoxic gas is a flammable gas, preferably the same gas as present in the first subsystem, and the gas exhausted by the venturi-pump is captured.

* * * * *